US008393769B2

(12) United States Patent
Akutagawa et al.

(10) Patent No.: US 8,393,769 B2
(45) Date of Patent: Mar. 12, 2013

(54) VEHICLE HEADLIGHT

(75) Inventors: Takashi Akutagawa, Tokyo (JP); Motoyuki Ichihara, Tokyo (JP); Yoshiaki Akiyama, Tokyo (JP); Yasuaki Kaizumi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 495 days.

(21) Appl. No.: 12/794,517

(22) Filed: Jun. 4, 2010

(65) Prior Publication Data

US 2010/0309680 A1 Dec. 9, 2010

(30) Foreign Application Priority Data

Jun. 4, 2009 (JP) ................................ 2009-135504

(51) Int. Cl.
*B60Q 1/00* (2006.01)
*F21V 11/00* (2006.01)

(52) U.S. Cl. ........................................ 362/539; 362/507

(58) Field of Classification Search .................. 362/507, 362/539, 538, 296.06
See application file for complete search history.

(56) References Cited

U.S. PATENT DOCUMENTS 5,636,917 A 6/1997 Furami et al.
7,775,698 B2 * 8/2010 Shoji et al. .................... 362/538
2004/0125614 A1 7/2004 Ishida et al.
2006/0215415 A1 * 9/2006 Suzuki et al. ................. 362/539
2008/0253141 A1 10/2008 Nakada et al.
2009/0257240 A1 * 10/2009 Koike ........................... 362/538

FOREIGN PATENT DOCUMENTS

JP 2696745 B2 9/1997
JP 2006-317513 A 11/2006
JP 4024628 B2 10/2007
JP 2008-262755 A 10/2008

* cited by examiner

*Primary Examiner* — Mariceli Santiago
*Assistant Examiner* — Glenn Zimmerman
(74) *Attorney, Agent, or Firm* — Kenealy Vaidya LLP

(57) ABSTRACT

A projector headlight for a low beam can include a light source, an ellipsoidal reflector, a projector lens and a shade. Light emitted from the light source can form a fundamental light distribution pattern from the projector lens via the ellipsoidal reflector by shielding an upward portion of the light with the shade. The shade can form a blurred part on a horizontal cut-off line using a radiused R surface between a top and front edge lines of the shade. Therefore, a contrasting difference between the upper and lower sides of the horizontal cut-off line can be reduced so as to be able to conform to a light distribution standard for a headlight. The R surface can be configured with a reflex surface or a non-reflex surface to match the light source. Thus, the projector headlight can perform a favorable light distribution pattern utilizing a simple structure.

20 Claims, 13 Drawing Sheets

VEHICLE HEADLIGHT

This application claims the priority benefit under 35 U.S.C. §119 of Japanese Patent Application No. 2009-135504 filed on Jun. 4, 2009, which is hereby incorporated in its entirety by reference.

BACKGROUND

1. Field

The presently disclosed subject matter relates to a vehicle headlight of a projector type, and more particularly to a projector headlight for a low beam having a favorable light distribution pattern that can conform to a light distribution standard for a headlight with respect to a contrasting difference between the upper and lower sides of a horizontal cut-off line in the light distribution pattern.

2. Description of the Related Art

A projector headlight for a low beam and/or a high beam is frequently incorporated into a vehicle lamp including a position lamp, a turn-signal lamp, etc. The projector headlight may allow a light-emitting area thereof to be reduced and therefore allows a vehicle lamp that includes such a projector headlight to be minimized in comparison with other types of headlights. In addition, when an LED is used as a light source for the projector headlight, a battery friendly and small projector headlight can be achieved.

A projector headlight is also disclosed in Applicant's co-pending patent application, U.S. patent application Ser. No. 12/794,488, filed on same date, Jun. 4, 2010, which is hereby incorporated in its entirety by reference.

A conventional projector headlight for use as a low beam light is disclosed in patent document No. 1 (Japanese Patent Application Laid Open JP2003-317513). FIG. 12 is a schematic side cross-section view depicting a structure for the conventional projector headlight in patent document No. 1, and an LED is used as a light source of this projector headlight.

According to the conventional projector headlight 50 shown in FIG. 12, the projector headlight 50 includes: an LED light source 52; an elliptical reflector 54 in which a first focus thereof is located near the LED light source 52; a projector lens 56 which has a focus thereof located near a second focus of the elliptical reflector 52; and a shade 58 located near the focus of the projector lens 56. Thus, an optical axis Z50 approximately corresponds with the respective optical axes of the elliptical reflector 54 and the projector lens 56, and the LED light source 52.

In the projector headlight 50, light emitted from the LED light source 52 is reflected on the elliptical reflector 54 and can be emitted in a forward direction of the projector headlight 50 via the projector lens 56. In this case, a part of the light that is reflected on the elliptical reflector 54 can be shielded by the shade 58. Accordingly, the projector headlight 50 can form a light distribution pattern for a low beam including a cut-off line in accordance with a top shape of the shade 58.

However, because the shade 58 is substantially located at the focus of the projector lens 56, a contrasting difference between the upper and lower sides of a horizontal cut-off line of an oncoming lane and of a driving lane in the light distribution pattern tends to become too clear. When the light-emitting area of the projector headlight 50 becomes smaller and/or the brightness thereof becomes brighter using a high power light source and/or the like, the contrasting difference may be especially enhanced and too clear. Thus, the projector headlight 50 may include a problem in that the excessive contrasting difference thereof causes a decrease of visibility in some cases.

In order to reduce the contrasting difference, another conventional projector headlight for use as a low beam light is disclosed in patent document No. 2 (Japanese Patent Application Laid Open JP2008-262755). FIG. 13 is a schematic side cross-section view depicting a projector lens for the other conventional projector headlight that is disclosed in patent document No. 2. According to this projector headlight, on a surface towards a focus F68 of a projector lens 66, convex surfaces are provided as a means to diffuse light that forms a cut-off line in a light distribution pattern. The convex surfaces may blur the cut-off line, and therefore may improve visibility in the light distribution pattern.

The above-referenced Patent Documents are listed below and are hereby incorporated with their English abstract in their entirety.

1. Patent document No. 1: Japanese Patent Application Laid Open JP2006-317513
2. Patent document No. 2: Japanese Patent Application Laid Open JP2008-262755

However, when diffusing light by a surface of the projector lens like the projector lens that is disclosed in patent document No. 2, the surface of the projector lens may effect a change in light other than that near the cut-off line, and therefore may cause a decrease of a maximum light intensity and/or a glare. In addition, it may be difficult to form convex surfaces on the surface of the projector lens during a manufacturing process, especially when the projector lens is made of a glass material, it may be very difficult because the process may become the last process.

The disclosed subject matter has been devised to consider the above and other problems, characteristics and features. Thus, an embodiment of the disclosed subject matter can include a projector headlight for a low beam having a favorable light distribution pattern that can conform to a light distribution standard for headlights with respect to a contrast difference between the upper and lower sides of a horizontal cut-off line. In this case, various light sources such as a semiconductor light source, an HID lamp, a halogen bulb and the like can be employed as a light source with a simple structure.

SUMMARY

The presently disclosed subject matter has been devised in view of the above and other characteristics, desires, and problems in the conventional art, and to make certain changes to existing projector headlights. Thus, an aspect of the disclosed subject matter includes providing a projector headlight for a low beam having a favorable light distribution pattern that can conform to a light distribution standard for headlights with respect to a contrast difference between the upper and lower sides of a horizontal cut-off line, wherein various light sources can be used as a light source with a simple structure and the basically same structure. Another aspect of the disclosed subject matter includes providing a projector headlight using an LED light source, which can result in a battery friendly and small projector headlight having a favorable light distribution pattern so that it can be used for various types of vehicles including an electric car and the like.

According to an aspect of the disclosed subject matter, a projector headlight can include a light source, at least one ellipsoidal reflector, a projector lens and a shade. At least the ellipsoidal reflector can have a first focus and a second focus, the first focus thereof being located near the light source. The projector lens can have both a focus and an optical axis thereof located substantially on an imaginary line connecting the first focus and the second focus of the at least one ellipsoidal reflector. The shade can comprise a neutral point and first, second and third top edge lines that respectively face first, second and third front edge lines with respect to each other. The shade can have the neutral point located near the focus of the projector. The first, second and third top edge lines can be configured to form a horizontal cut-off line with light emitted from the light source, and an R surface between the first, second and third top edge lines and the first, second and third front edge lines can be configured to slant down in a direction towards the projector lens. The R surface can be configured to form a continuous blur portion on the horizontal cut-off line.

In the above-described exemplary projector headlight, the light emitted from the light source can form a fundamental light distribution pattern from the projector lens via the ellipsoidal reflector by shielding an upwardly directed light with the shade. In this case, because light that is reflected on the R surface underneath the first, second and third top edge lines that form the horizontal cut-off line can illuminate a position on the horizontal cut-off line, a position on the horizontal cut-off line can become dark. Accordingly, contrast difference between the upper and lower sides of the horizontal cut-off line can be reduced. In addition, because the first top edge line can be located at a higher position than the second top edge line, the first, second and third top edge lines can form a cut-off line for a driving lane, an oncoming lane and an elbow line, respectively.

In this case, the R surface can be configured to form a circular shape, and a radius and/or a position of the R surface can change. Therefore, according to a light distribution standard for a headlight, characteristics of the blur portion such as width, thickness, brightness and the like can be adjusted. In addition, the R surface can be configured with a reflex surface or a non-reflex surface (i.e., a reflective surface or a non-reflective surface) to match characteristics of various light sources such as a semiconductor light source, an HID lamp, a halogen bulb, etc.

Furthermore, second focuses of other ellipsoidal reflectors other than at the least one ellipsoidal reflector can be located substantially on the second top edge line of the shade and a virtual extending line of the second top edge line. Thus, the projector headlight of the disclosed subject matter can form a favorable light distribution with a wide range and a simple structure, and the structure can be the basically the same even if various and different light sources are used as a light source (s).

According to another aspect of the disclosed subject matter, a projector headlight can include: an LED light source having an optical axis located on a base board; at least one ellipsoidal reflector having a first focus and a second focus, and attached to the base board so that the first focus thereof can be located substantially at the LED light source; a projector lens having both a focus and an optical axis located substantially on an imaginary line that connects the first focus and the second focus of the at least one ellipsoidal reflector, and the focus of the projector lens being located substantially at the second focus of the at least one ellipsoidal reflector; a shade; and a housing attaching the projector lens, the shade and the at least one ellipsoidal reflector.

In the above-described projector headlight, because the structure of the shade, the ellipsoidal reflector and the projector lens can be substantially the same, the projector headlight using the LED light source can perform the features set forth above in paragraphs [0013]-[0016]. In addition, the optical axis of the LED light source can intersect with the imaginary line of the projector lens substantially at the first focus of the at least one ellipsoidal reflector so as to correspond with each other in a vertical direction. An intersecting angle of the optical axis of the LED light source and the imaginary line of the projector lens towards the at least one ellipsoidal reflector can be smaller than the intersecting angle towards the projector lens.

Therefore, the projector headlight can improve a faraway (or distance) visibility because light emitted from the LED light source can illuminate at the faraway point. Moreover, second focuses of other ellipsoidal reflectors other than at least the ellipsoidal reflector can also be located substantially on the first top edge line of the shade and the second top edge line in order to improve a light use efficiency. Thus, the disclosed subject matter can provide a small projector headlight that can perform a favorable light distribution pattern with a high efficiency and low power consumption, and which can be used for an electrical car and the like.

BRIEF DESCRIPTION OF THE DRAWINGS

These and other characteristics and features of the disclosed subject matter will become clear from the following description with reference to the accompanying drawings, wherein.

DETAILED DESCRIPTION OF EXEMPLARY EMBODIMENTS

Figure 1:
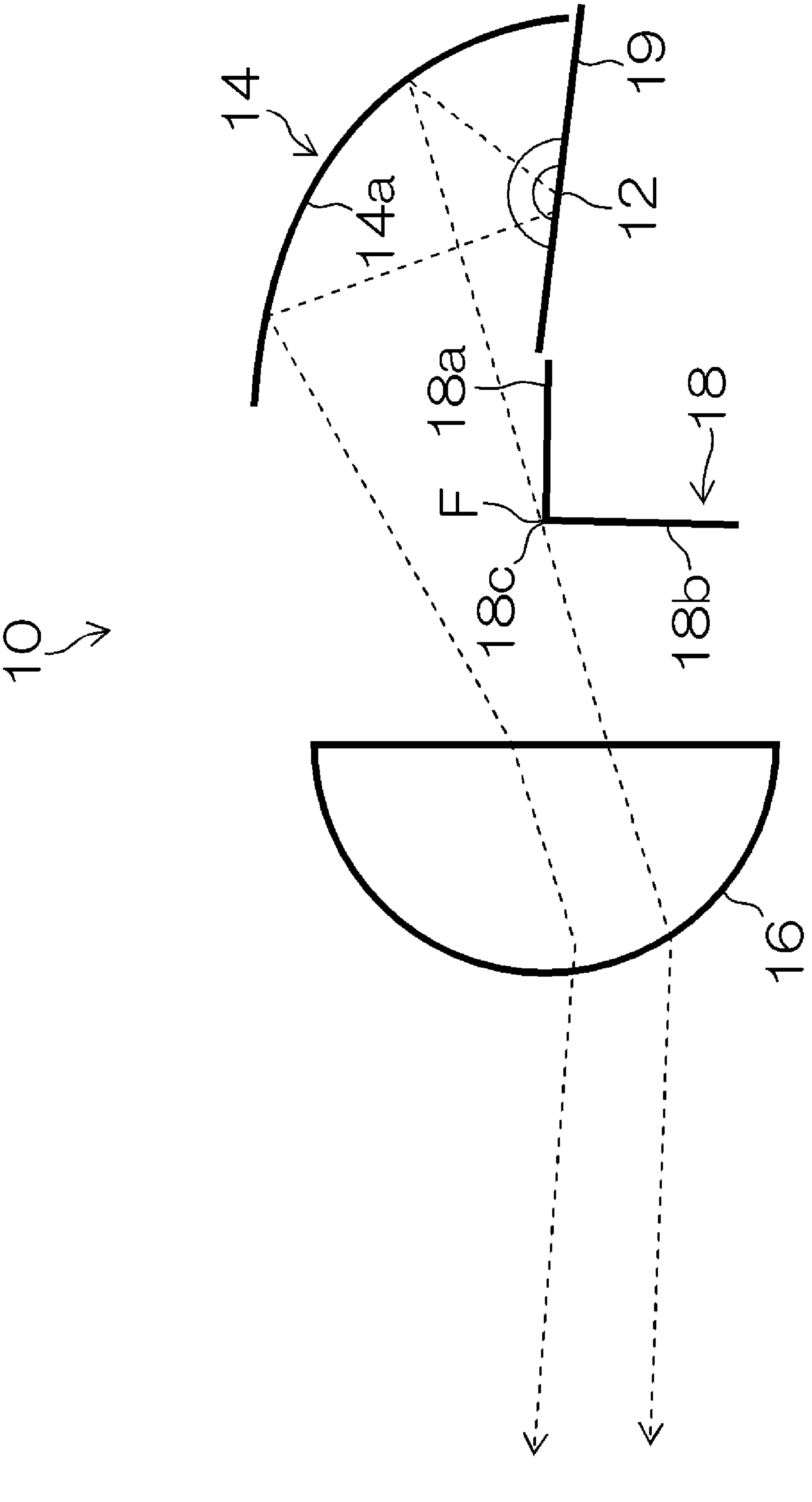
FIG. 1 is a schematic side cross-section view showing an exemplary structure of a vehicle headlight of a projector type for a low beam made in accordance with principles of the disclosed subject matter.

The disclosed subject matter will now be described in detail with reference to FIG. 1 to FIG. 11. FIG. 1 is a schematic side cross-section view showing an exemplary vehicle headlight of a projector type for a low beam made in accordance with principles of the disclosed subject matter. The projector headlight 10 for a low beam can include: a semiconductor light source 12, a reflector 14, a projector lens 16 and a shade 18.

The semiconductor light source 12 can be, for example, a white LED which is attached to a base board 19 so that an optical axis of the semiconductor light source 12 can slant in the opposite direction of the projector lens 16. Other semiconductor devices such as a laser can also be used as the semiconductor light source 12.

The reflector 14 can be located so as to cover the semiconductor light source 12. An inner surface of the reflector 14 can be configured with a reflex surface 14*a* in a free surface shape based on a plurality of ellipsoidal reflex surfaces. Therefore, the reflex surface 14*a* can be basically ellipsoidal having a first focus and a second focus, and the first focus can be located at substantially the semiconductor light source 12 so that light emitted from the semiconductor light source 12 can concentrate at the second focus through the reflex surface 14*a*.

The second focus of the reflex surface 14*a* can be located near a focus F of the projector lens 16. Thus, an optical axis of the projector headlight 10 can substantially correspond to an optical axis of the projector lens 16 including the focus F, the semiconductor light source 12, and the first and second focus of the reflex surface 14*a*. Light emitted from the semiconductor light source 12 can be illuminated as an inverted light in a forward direction of the projector headlight 10 via the projector lens 16.

When the projector headlight 10 is used in low beam mode using the above-described structure, the projector headlight 10 can include the shade 18 in order to shield an upward light that may give a glaring type light to an oncoming car and the like. The shade 18 can include a horizontal plate 18*a*, a vertical plate 18*b* and a top edge 18*c*. A surface treatment for reflecting light such as an aluminum deposition, a silver coating and the like can be formed on the horizontal plate 18*a* so that light arriving at the horizontal plate 18*a* can be reflected towards the projector lens 16.

The top edge 18*c* can be located between the horizontal plate 18*a* and the vertical plate 18*b*, and can be configured to form a horizontal cut-off line for an oncoming lane and for a driving lane. The shade 18 can be located so that the focus F of the projector lens 16 can be located at or near (i.e., substantially at) the top edge 18*c* thereof. Therefore, the projector headlight 10 can form a light distribution pattern for a low beam with light emitted from the semiconductor light source 12 through the shade 18 and the projector lens 16.

Figure 2:
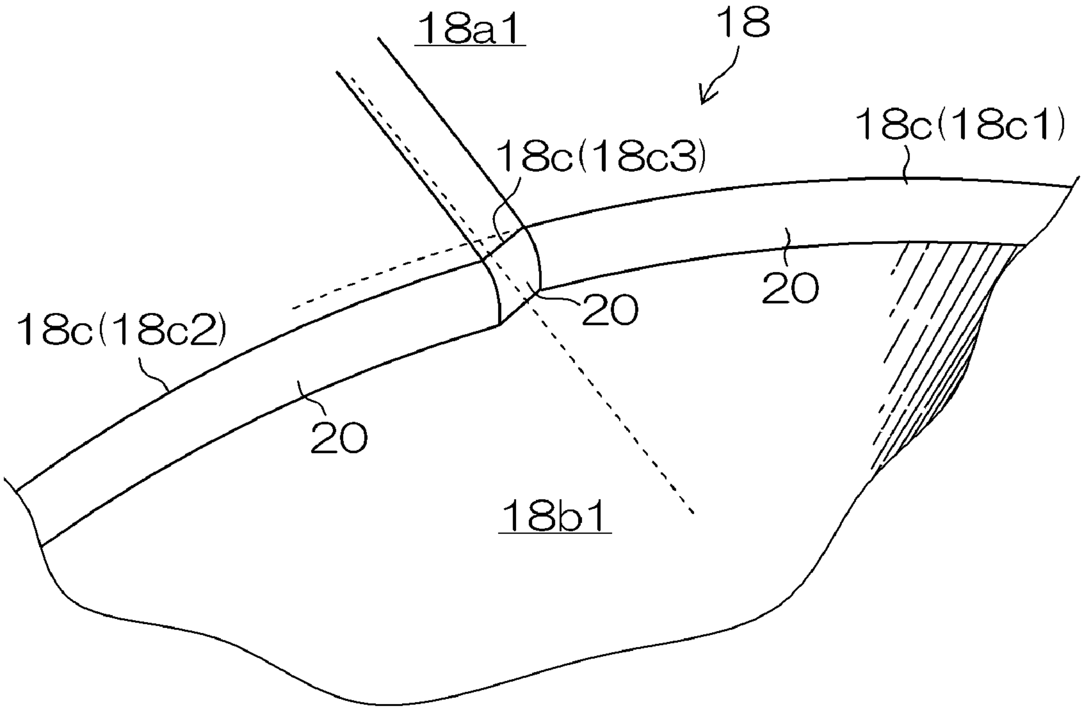
FIG. 2 is a partial schematic close-up view showing a shade for the projector headlight shown in FIG. 1 and is a perspective view from a front top of the shade.

The shade 18 will now be described in detail. FIG. 2 is a partial perspective close-up view showing the shade 18 for the projector headlight 10 shown in FIG. 1 and is a perspective view from a front top of the shade 18. The horizontal plate 18*a* of the shade 18 can include a top surface 18*a*1, and the vertical plate 18*b* can include a front surface 18*b*1. An end of the top surface 18*a*1 towards the front surface 18*b*1 can include or constitute the top edge 18*c*.

The top edge 18*c* can be formed in a substantially circular arc shape as viewed from a top view of the shade 18, and can be configured to form a top line of the horizontal cut-off line. The top edge 18*c* can include: a first top edge line 18*c*1 for forming the top line of the horizontal cut-off line for an oncoming lane, a second top edge line 18*c*2 for forming the top line of the horizontal cut-off line for a driving lane, and a third top edge line 18*c*3 that is located between the first top edge line 18*c*1 and the second top edge line 18*c*2 for forming the top line of an elbow line on the cut-off line near a vertical line.

In addition, an R surface 20, for example a radiused surface, can be formed between the top edge 18*c* and an edge of the front surface 18*b*1 that includes a first front edge line, a second front edge line and a third front edge line so as to face the first top edge line 18*c*1, the second top edge line 18*c*2 and the third top edge line 18*c*3, respectively. Moreover, a height of the first top edge line 18*c*1 of the top edge 18*c* can be higher than that of the second top edge line 18*c*2 in a side view from the projector lens 16. Therefore, the third top edge line 18*c*3 can slant between the first top edge 18*c*1 and the second top edge 18*c*2.

Figure 3A:
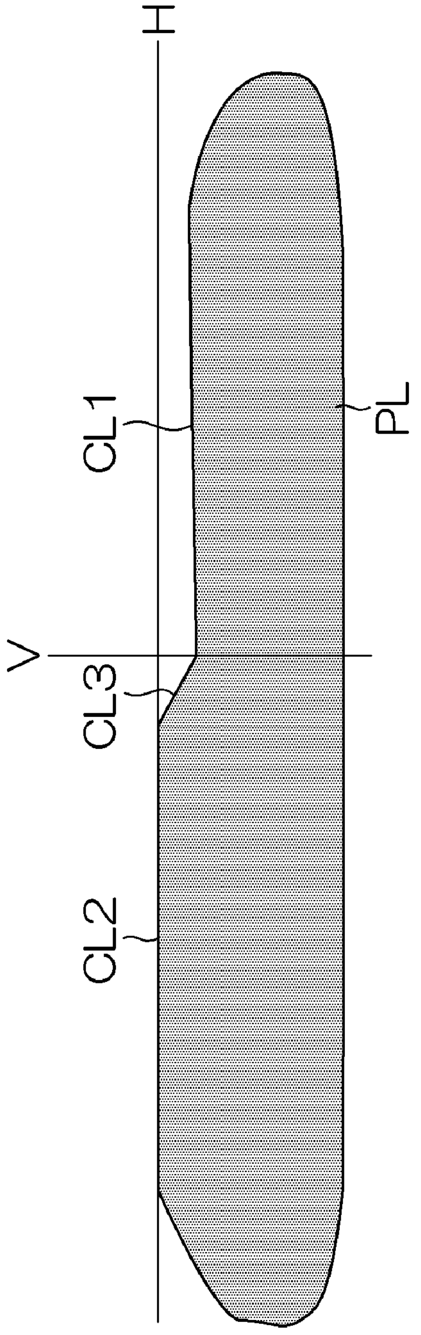
FIG. 3a CONVENTIONAL ART
FIG. 3*a* and FIG. 3*b* are schematic diagrams showing fundamental light distribution patterns formed on a virtual screen that is vertically located at 25 meters away from the projector headlight of FIG. 1, wherein a conventional shade and an exemplary shade made in accordance with the disclosed subject matter are used as shades used in FIG. 3*a* and FIG. 3*b*, respectively.

FIG. 3*a* is a schematic diagram showing a fundamental light distribution pattern formed on a virtual screen that is vertically located at 25 meters away from the projector headlight, which includes a conventional shade without the R-surface 20 shown in FIG. 2. The fundamental light distribution pattern PL can include a horizontal cut-off line CL1 on the oncoming lane that is formed by the first top edge line 18*c*1 of the shade 18. The horizontal cut-off line CL1 can be formed downward than a horizontal line H due to the oncoming lane.

The fundamental light distribution pattern PL can include a horizontal cut-off line CL2 on the driving lane that is formed by the second top edge line 18*c*2. The horizontal cut-off line CL2 can be formed substantially on the horizontal line H because of the driving lane. In addition, the fundamental light distribution pattern PL can include an elbow line CL3 between the horizontal line CL1 for the oncoming lane and the horizontal line CL2 for the driving lane, which is formed by the third top edge line 18*c*3.

In this case, the shade 18 can include a neutral point that is an intersection of a virtual extending line of the second top edge line 18*c*2 and another virtual line that passes at a intersection of the first top edge line 18*c*1 and the third top edge line 18*c*3 and intersects with the virtual extending line of the second top edge line 18*c*2 at a right angle. The neutral point can be located substantially at the focus F of the projector lens 16 so that the first and second top edge liens 18*c*1, 18*c*2 can be configured to form the horizontal cut-off line for both a driving lane and an oncoming lane with the light emitted from the semiconductor light source 12.

Figure 3B:
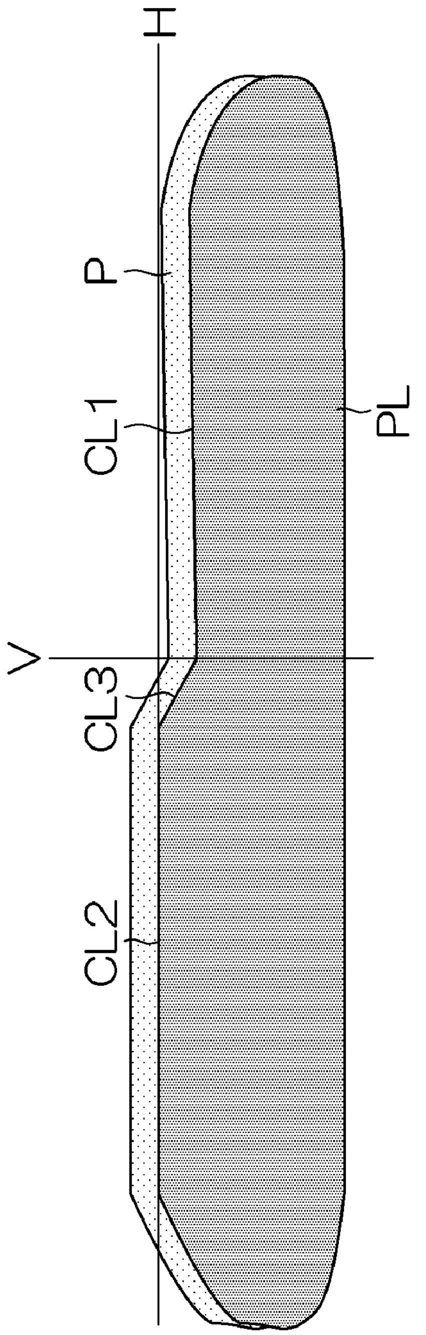
Figure 4A:
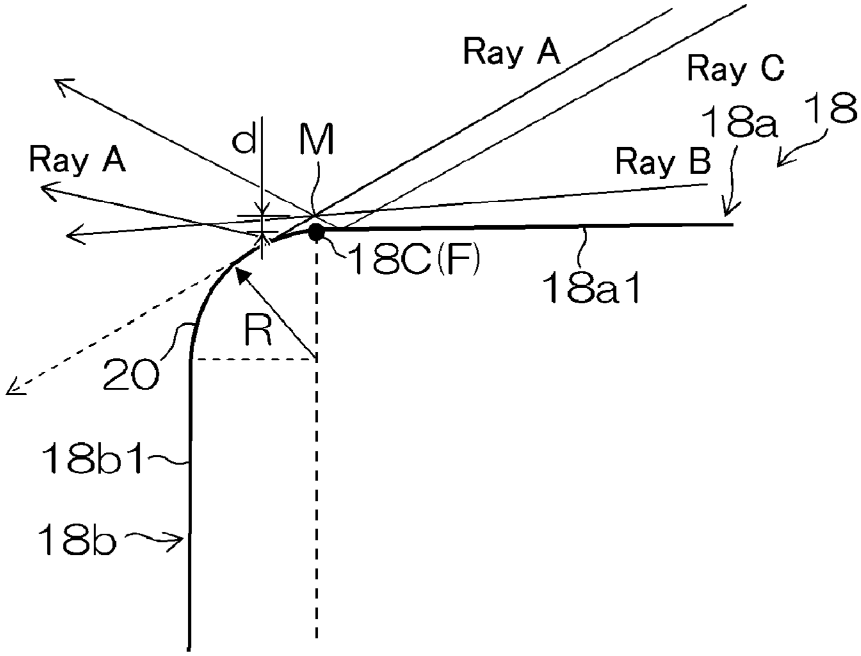
FIG. 4*a* and FIG. 4*b* are partial close-up side cross-section views showing the exemplary shade made in accordance with the disclosed subject matter and the conventional shade, respectively.
Figure 4B:
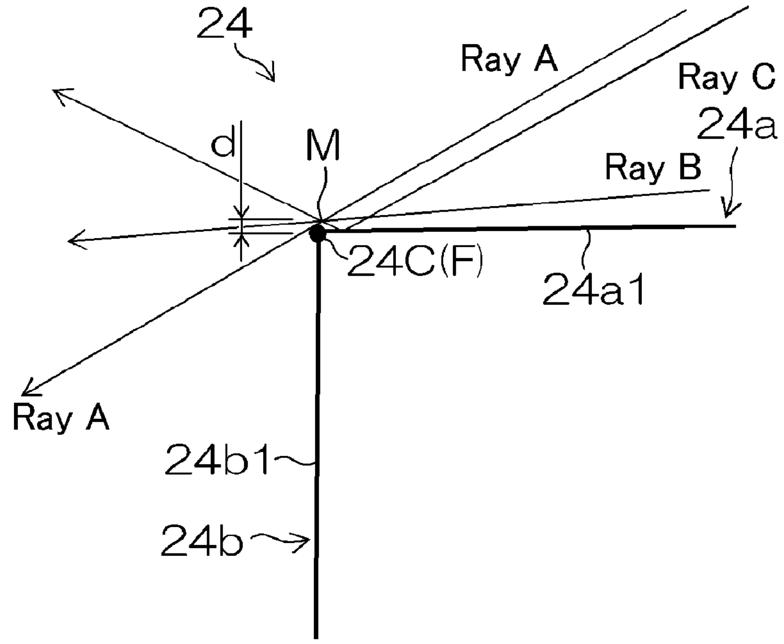
FIG. 4b CONVENTIONAL ART

FIG. 3*b* is a schematic diagram showing a fundamental light distribution pattern formed on the virtual screen that is vertically located at 25 meters away from the projector headlight, which includes the shade 18. In this case, a continuous blur portion P can be formed on the horizontal cut-off line CL1-CL3 by the R surface. A principle of the continuous blur portion P will now be described in detail with reference to FIG. 4*a* and FIG. 4*b*. FIG. 4*a* and FIG. 4*b* are partial close-up side cross-section views showing the shade 18 and a conventional shade, respectively.

The conventional shade 24 shown in FIG. 4*b* includes: a horizontal plate 24*a*; a top surface 24*a*1 located on the horizontal plate 24*a*; a top edge line being an end of the top surface 24*a*1; a vertical plate 24*b*; and a front surface 24*b*1 located on the vertical plate 24*b* that is substantially perpendicular to the horizontal plate 24*a*. A mark 24C(F) shows a point on the top edge line of the end of the top surface 24*a*1, and the top edge line of the end of the top surface 24*a*1 can form the horizontal cut-off line CL1-CL3 in the light distribution pattern PL as shown in FIG. 3*a*.

The shade 18 shown in FIG. 4*a* can include a point 18C (F) on the top edge 18*c* corresponding to the point 24C (F) shown in FIG. 4*a*. The horizontal plate 18*a* can extend toward the projector lens 16 from the top edge 18*c* including the point 18C(F), and the R surface 20 can be located in a circular arc shape between the top edge 18*c* and the front surface 18*b*1 so as to extend along the top edge 18*c* and the front surface 18*b*1. A surface treatment for reflecting light can be formed on the R surface 20 as well as the top surface 18*a*1. The R surface 20 can result in the continuous blur portion P as shown in FIG. 3*b*.

More specifically, light rays A, B and C can be caused to intersect at a point M shown in FIG. 4*a*. With regard to FIG. 4*b*, the point M is located at a distances d away from the point 24C (F) in an upwards direction of the point 24C (F). The ray A emitted from the semiconductor light source 12 intersects with the point M and passes over the point 24C (F). The ray B intersects with the point M at an angle that is nearly equal to 0 degree with respect to the top surface 24*a*1, and passes over the point 24C(F). The ray C is reflected on the top surface 24*a*1 and passes at the point M.

In this case, when each of the projector headlights include the shade 18 shown in FIG. 4*a* or the shade 24 shown in FIG. 4*b*, each of the rays B passes at the point M without a contact with the shades 18 and 24, respectively, and enters into the projector lens 16. Then, each of the rays B that passes over the shades 18 and 24 may be emitted toward the substantially same position under the horizontal cut-off line through the projector lens 16, respectively.

Each of the rays C passes at the point M after reflecting on the shades 18 and 24, and enters into the projector lens 16, respectively. Then, each of the rays C that reflect on the shades 18 and 24 may be emitted slightly upwards through the projector lens 16, respectively. The ray A shown in FIG. 4*b* that passes at the point M over the shade 24 can be emitted under the horizontal cut-off line through the projector lens 16.

On the other hand, the ray A shown in FIG. 4*a* that passes at the point M gets to the R surface 20, and may be reflected on the R surface. The ray A can be emitted from the projector lens 16 as a ray emitted under the top edge 18*c*, and therefore can be emitted on or slightly over the horizontal cut-off line through the projector lens 16. Thus, the light that is reflected on the R surface 20 can basically form the continuous blur portion P on the horizontal cut-off line CL1-CL3. In this case, the nearer (smaller) the distance d is, the larger the ray forming the blur portion P is.

Figure 5:
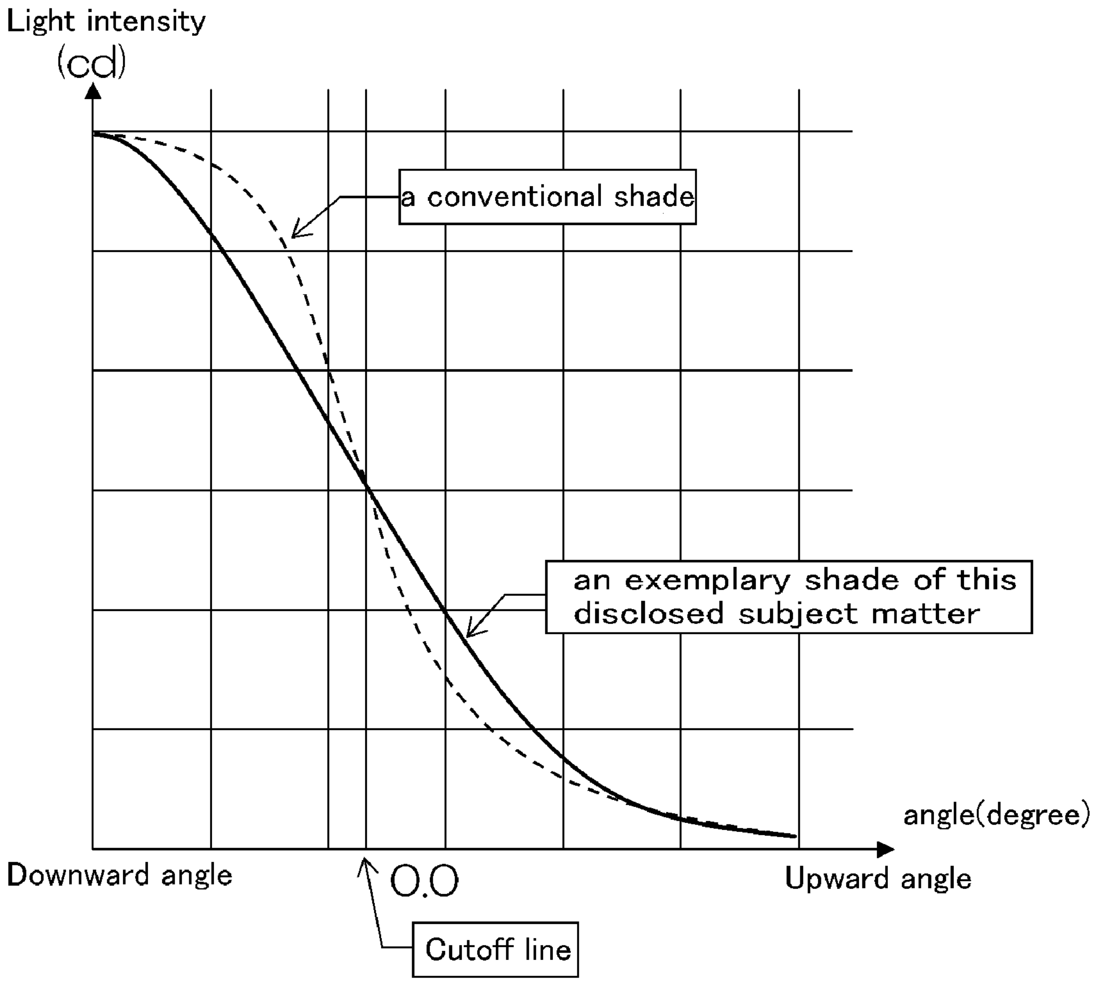
FIG. 5 is a graph showing a relation between an angle in a horizontal direction and a light intensity of a light distribution near a cut-off line with respect to projector headlights using an exemplary shade according to the disclosed subject matter and a conventional shade.

FIG. 5 is a graph showing a relation between an angle in a horizontal direction and a light intensity of a light distribution near the cut-off line with respect to projector headlights using the shade 18 as compared with the conventional shade 24. When the conventional shade 24 is used, a slant of the light intensity becomes sharp near the cut-off line. When the shade 18 of the disclosed subject matter is used in the projector headlight 10, the slant of the light intensity can become moderate near the horizontal cut-off line.

That is to say, the intensity of the light distribution pattern in accordance with the disclosed subject matter can be slightly decreased underneath the horizontal cut-off line as compared to that of the conventional light distribution pattern. In addition, the intensity of the light distribution pattern in accordance with the disclosed subject matter can be slightly increased on the horizontal cut-off line. Thus, the shade 18 of the disclosed subject matter can result in the continuous blur portion P near the horizontal cut-off line of the light distribution pattern.

The above-description assumes that both the top edge 18*c* of the shade 18 and the top edge 24*c* of the conventional shade 24 correspond to (are located substantially at) the focus F of the projector lens 16. However, even when both top edges 18*c* and 24*c* do not correspond to the focus F of the projector lens 16, the continuous blur portion P near the horizontal cut-off line can be formed by the R surface 20 that is provided underneath the top edge 18*c*. Thus, the project headlight 10 of the disclosed subject matter can form the continuous blur portion P on the horizontal cut-off line CL1-CL3 as shown in FIG. 3*b* with the diffusing light that is reflected on the R surface 20.

According to a vehicle headlight standard (for example, ECE Regulation), a maximum light intensity of H-V point (an intersection of the horizontal line H and the vertical line V shown in FIG. 3*a*) in front of a headlight is established so that the headlight is prevented from producing glare towards an oncoming car and/or pedestrian. When a central portion of the cut-off line in the light distribution pattern shown in FIG. 3*a* is provided with the blur effect by the above-described R surface, the diffusing light reflected from the R surface may exceed the reference of the maximum light intensity due to an increase of the light intensity.

Therefore, the shade 18 can be made so as not to cause such a problem. For example, the R surface 20 can be designed so that the R surface is not formed near a part of the top edge 18*c* that corresponds to such a region of the cut-off line, or so that the R surface having a small radius is formed near the part of the top edge 18*c*. In addition, the R surface can be formed only within a prescribed range in order to be able to conform to a standard with regard to a light intensity of a cut-off line for a headlight.

Figure 6:
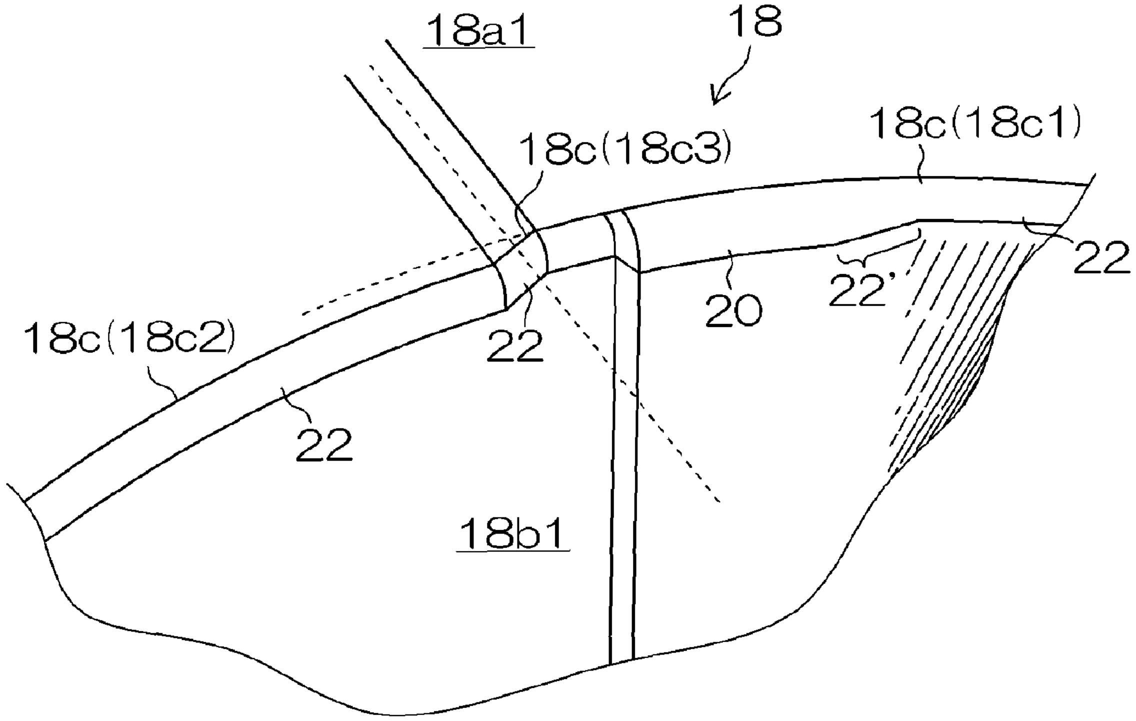
FIG. 6 is a partial schematic enlarged view depicting another exemplary shade and is a perspective view from a front top of the shade, which blurs the light intensity within a prescribed range of a cut-off line.

FIG. 6 is a partial schematic enlarged view depicting another exemplary shade and is a perspective view from a front top of the shade 18, which blurs the light intensity within the prescribed range of the cut-off line. The R surface 20 can be formed from 1 millimeter away from a point between the second and third top edge lines 18*c*2 and 18*c*3, to 4 millimeters away from that point. Another R surface 22 that has a smaller radius than that of the R surface 20 can be formed out of the range of the above R surface 20.

Figure 7:
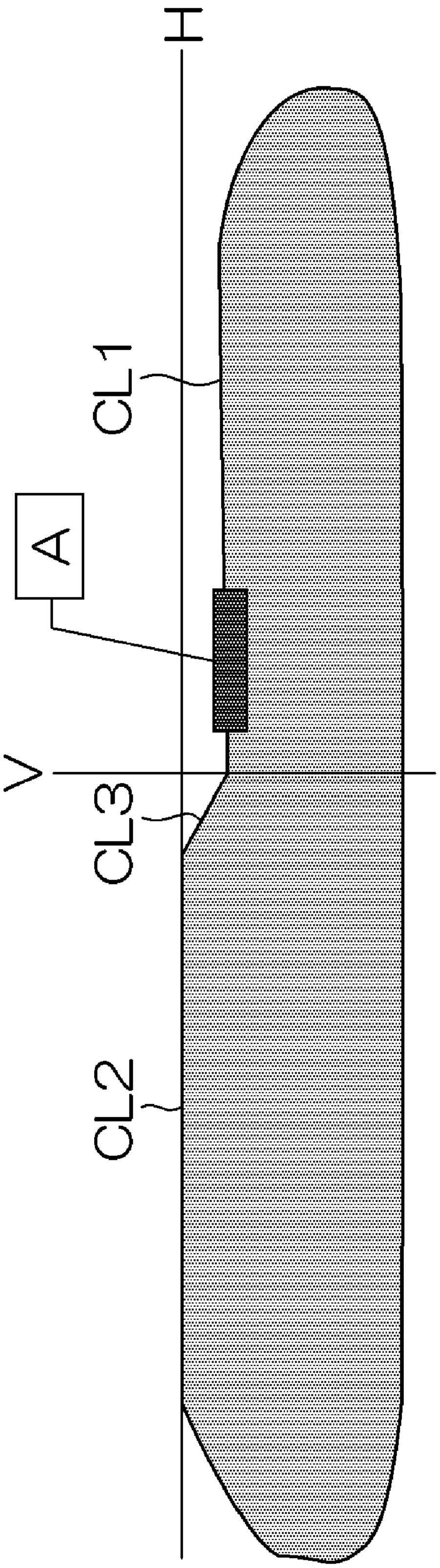
FIG. 7 is an explanatory schematic diagram showing a fundamental light distribution pattern formed by the shade shown in FIG. 6.

FIG. 7 is an explanatory schematic diagram showing a fundamental light distribution pattern formed by the shade 18 shown in FIG. 6. A blur portion A corresponding to the above-described R surface 20 can be formed near a part of the cut-off line CL1. A radius of other R surface between the R surfaces 20 and 22 shown in FIG. 6 changes from the large radius of the R surface 20 to the small radius of the R surface 22 by certain degrees. A degree of the blur portion can be adjusted by the above-described structure carefully in accordance with a headlight standard.

Figure 8:
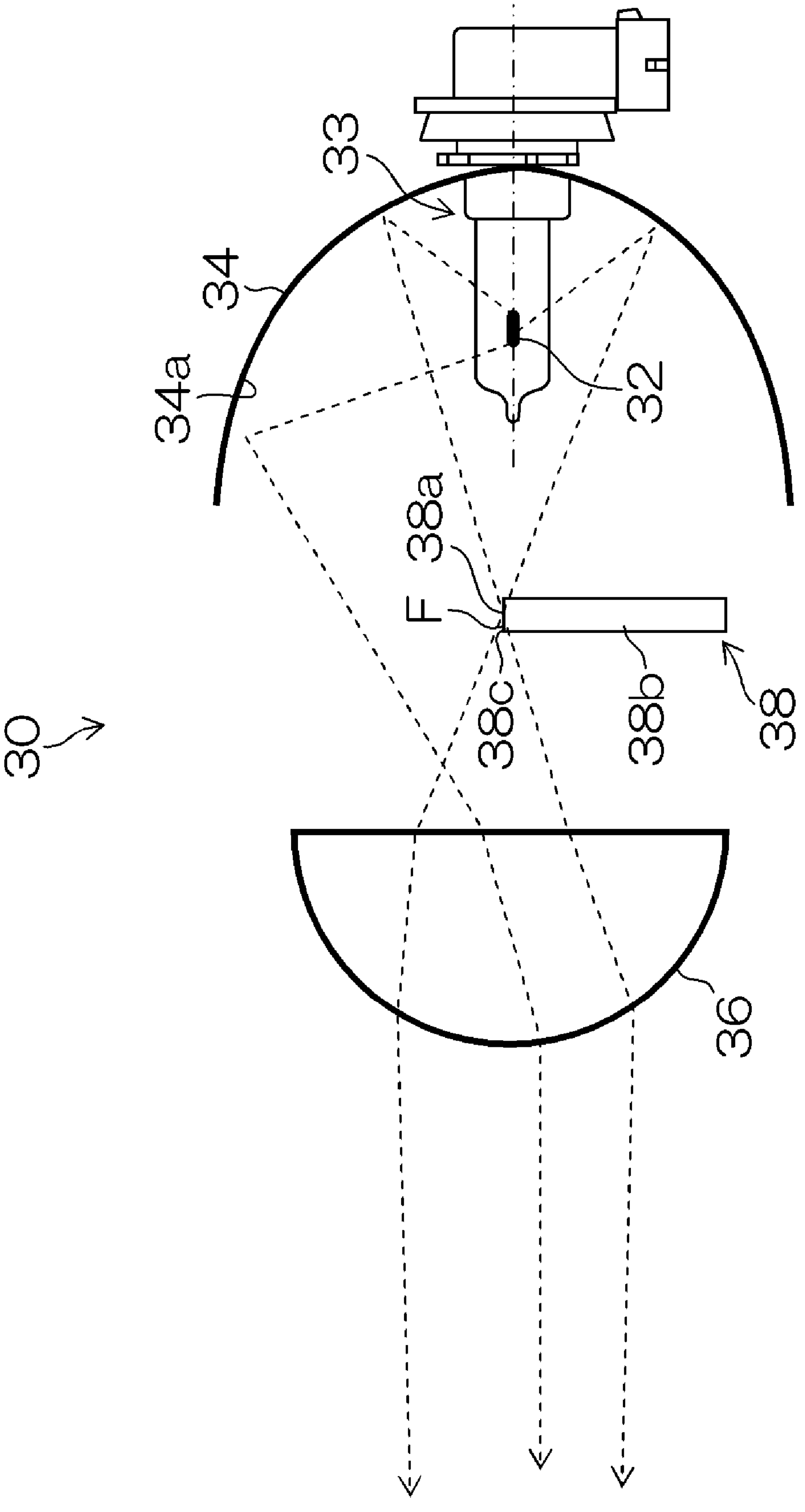
FIG. 8 is a schematic cross-section view depicting another exemplary vehicle headlight of a projector type for a low beam made in accordance with principles of the disclosed subject matter.

FIG. 8 is a schematic cross-section view depicting another exemplary vehicle headlight of a projector type for a low beam made in accordance with principles of the disclosed subject matter. A projector headlight 30 for a low beam can include: a light source unit 33 including a light source 32, a reflector 34, a projector 36 and a shade 38.

The light source 32 can be a high intensity discharge lamp (HID) lamp, a halogen bulb, etc. The reflector 34 can be located so as to cover the light source 32. An inner surface of the reflector 34 can be configured with a reflex surface 34*a* configured in a free surface shape based on a plurality of ellipsoidal reflex surfaces. Therefore, the reflex surface 34*a* can be basically ellipsoidal having a first focus and a second focus, and the first focus can be located at substantially the light source 32 so that light emitted from the light source 32 can concentrate at the second focus through the reflex surface 34*a*.

The second focus of the reflex surface 34*a* can be located near a focus F of the projector lens 36. Thus, an optical axis of the projector headlight 30 can substantially correspond to an optical axis of the projector lens 36 including the focus F, the light source 32, and the first and second focus of the reflex surface 34*a*. Light emitted from the light source 32 can be illuminated as an inverted light in a forward direction of the projector headlight 30 via the projector lens 36.

The projector headlight 30 can include the shade 38 in order to shield an upward light that may give a glaring type light to an oncoming car and the like, and therefore can form the light distribution pattern PL for a low beam as shown in FIG. 3*a*. The shade 38 can include a top surface 38*a*, a front surface 38*b* and a top edge 38*c* that can be configured to form a cut-off line CL1-CL3 on the light distribution pattern PL.

Figure 9A:
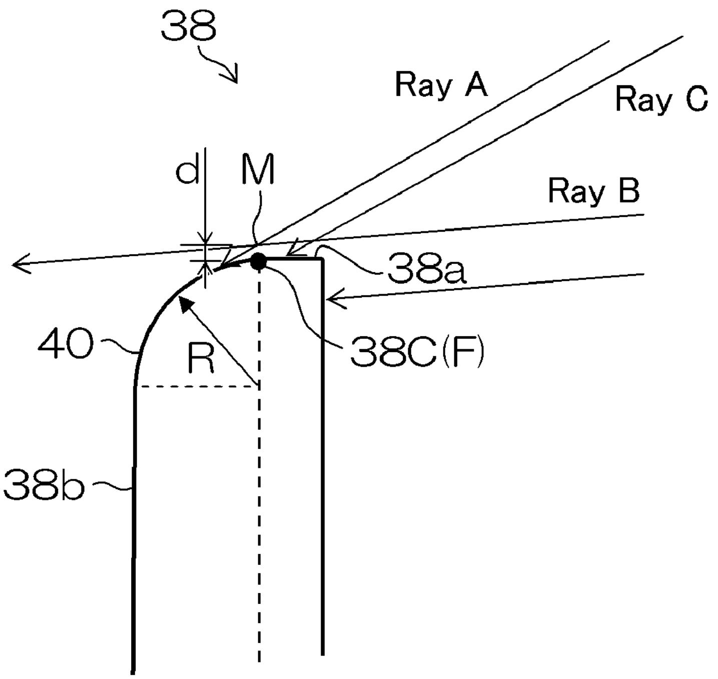
FIG. 9*a* and FIG. 9*b* are partial close-up side cross-section views showing another exemplary shade made in accordance with the disclosed subject matter and another conventional shade, respectively.
Figure 9B:
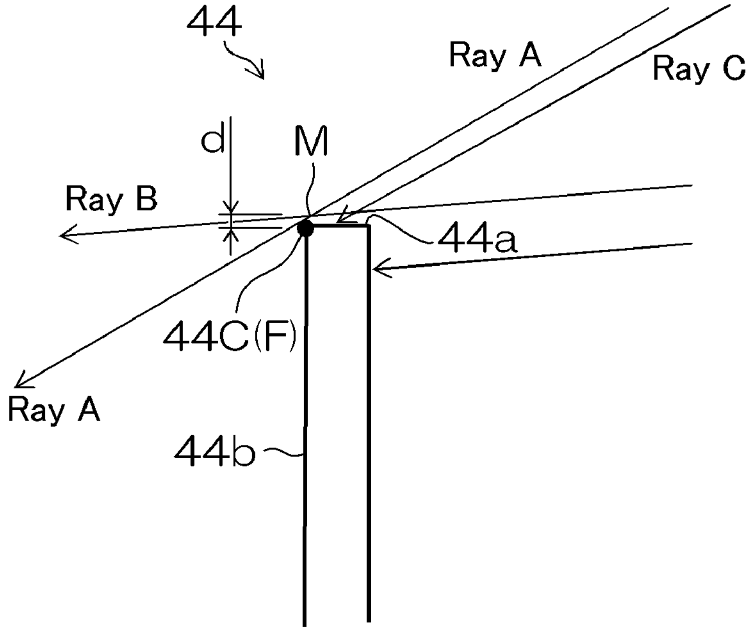
FIG. 9b CONVENTIONAL ART

The shade 38 of the projector headlight 30 can be made of an aluminum material such as an aluminum die cast material, steel plate cold (SPC), etc. However, a surface treatment may not be carried out, unlike with the shade 18 in which surface treatment can be carried out. FIG. 9*a* and FIG. 9*b* are partial close-up side cross-section views showing another exemplary shade made in accordance with the disclosed subject matter and another conventional shade, respectively.

The conventional shade 44 shown in FIG. 9*b* includes: a top surface 44*a*; a top edge being an end of the top surface 44*a*; and a front surface 44*b* located substantially perpendicular to the top surface 44*a*. A mark 44C(F) shows a point on the top edge of the end of the top surface 44*a*, and the top edge of the end of the top surface 44*a* can form the horizontal cut-off line CL1-CL3 in the light distribution pattern PL as shown in FIG. 3*a*.

The shade 38 shown in FIG. 9*a* can include a point 38C (F) on the top edge corresponding to the point 44C (F) shown in FIG. 9*b*. The horizontal plate 38*b* can extend toward the projector lens 16 from the top edge including the point 38C (F), and R surface 40 can be configured in a circular arc shape and located between the top edge line and the front surface 38*b* so as to extend along the top edge and the front surface 38*b*1. A surface treatment for reflecting light may not be formed on the R surface 40 but rather a surface treatment for absorbing light can be formed on the R surface 40. The R surface 40 can result in the continuous blur portion P as shown in FIG. 3*b*.

More specifically, rays A, B and C may intersect with a point M shown in FIG. 9*b*. The point M is located at a distances d away from the point 44C (F) in an upwards direction of the point 44C (F). The ray A emitted from the light source 32 intersects with the point M and passes over the point 44C (F). The ray B intersects with the point M at an angle that is nearly equal to 0 degree with respect to the top surface 44*a*, and passes over the point 44C(F). If the top surface 44*a* is formed with a reflex surface, the ray C may be reflected on the top surface 44*a* and may pass at the point M.

In this case, when each of the shade 38 shown in FIG. 9*a* and the shade 44 shown in FIG. 9*b* is used as a shade, each of the rays B passes at the point M without contact with the shades 38 and 44, respectively, and enters into the projector lens 36. In this case, each of the rays B that passes over the shades 38 and 44 may be emitted toward the substantially same position under the horizontal cut-off line through the projector lens 36, respectively.

However, each of the rays C gets to the shades 38 and 44, and may be absorbed in the shades 38 and 44 without entering into the projector lens 36, respectively. On the other hand, the ray A shown in FIG. 9*b* that passes at the point M over the shade 44 can be emitted under the horizontal cut-off line through the projector lens 36. However, the ray A shown in FIG. 9*a* gets to the R surface 40 and may be absorbed in the shade 38. Therefore, the shade 38 of the disclosed subject matter can decrease light emitted near the horizontal cut-off line by using the R surface 40 that is a non-reflex surface as compared with the other conventional shade 44.

Figure 10:
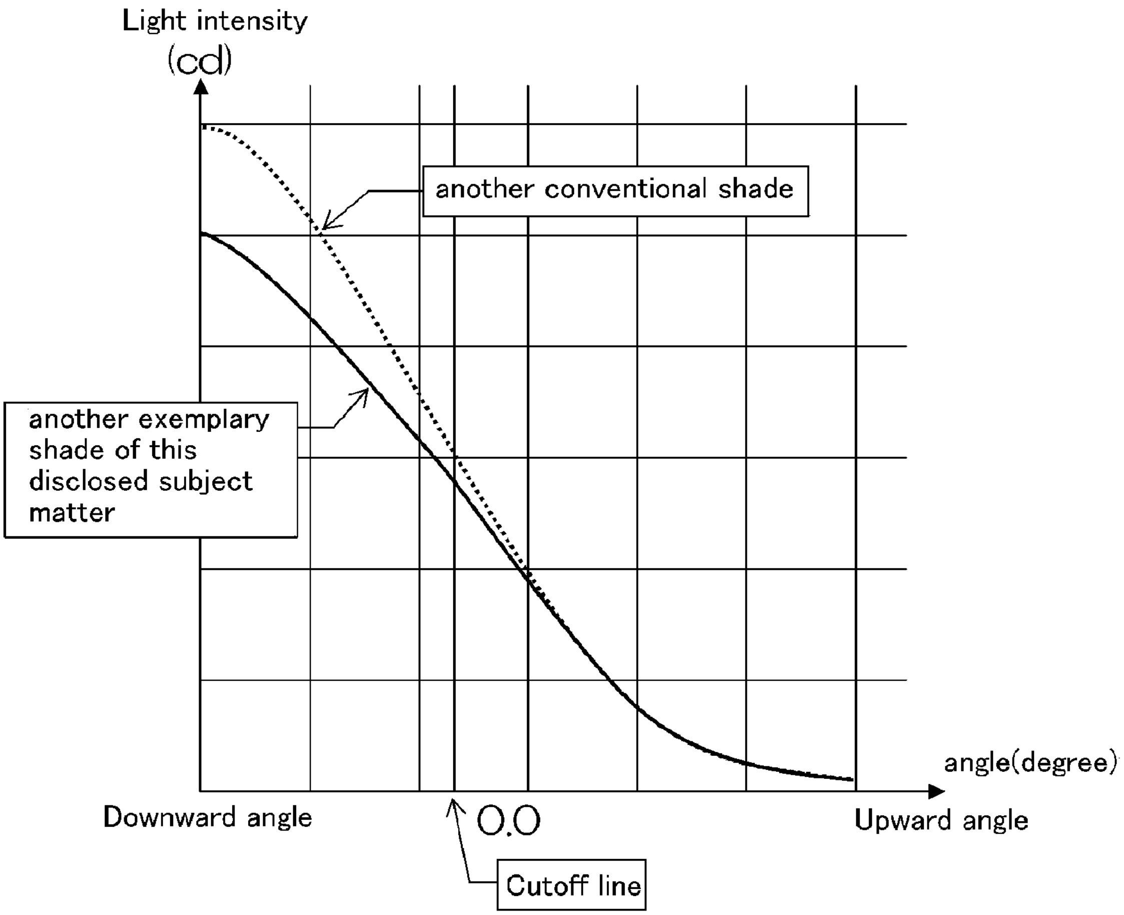
FIG. 10 is a graph showing a relation between an angle in a horizontal direction and a light intensity of a light distribution near a cut-off line with respect to projector headlights using the exemplary shade of FIG. 9*a* and the conventional shade of FIG. 9*b;*

FIG. 10 is a graph showing a relation between an angle in a horizontal direction and a light intensity of a light distribution near a horizontal cut-off line with respect to projector headlights using the exemplary shade of FIG. 9*a* and the conventional shade of FIG. 9*b*. When the conventional shade 44 is used, a slant of the light intensity becomes sharp near the cut-off line. However, when the shade 38 of the exemplary embodiment is used in the projector headlight 10, the slant of the light intensity can become moderate near the horizontal cut-off line.

That is to say, the intensity of the light distribution pattern in accordance with the disclosed subject matter can be slightly decreased underneath the horizontal cut-off line as compared to that of the conventional light distribution pattern. In addition, the intensity of the light distribution pattern can also be slightly increased on the horizontal cut-off line. Thus, the shade 38 of the disclosed subject matter can also allow forming of the continuous blur portion P near the horizontal cut-off line of the light distribution pattern because of the action in which light is absorbed on the R surface 40.

The above description is set forth so that both the top edge point 38C (F) of the shade 38 and the top edge point 44C (F) of the conventional shade 44 correspond to the focus F of the projector lens 36. However, even when both top edge points 38C (F) and 44C (F) do not correspond to the focus F of the projector lens 36, the continuous blur portion P near the horizontal cut-off line can be formed by the R surface 40 that is provided underneath the top edge 38*c*.

Figure 11:
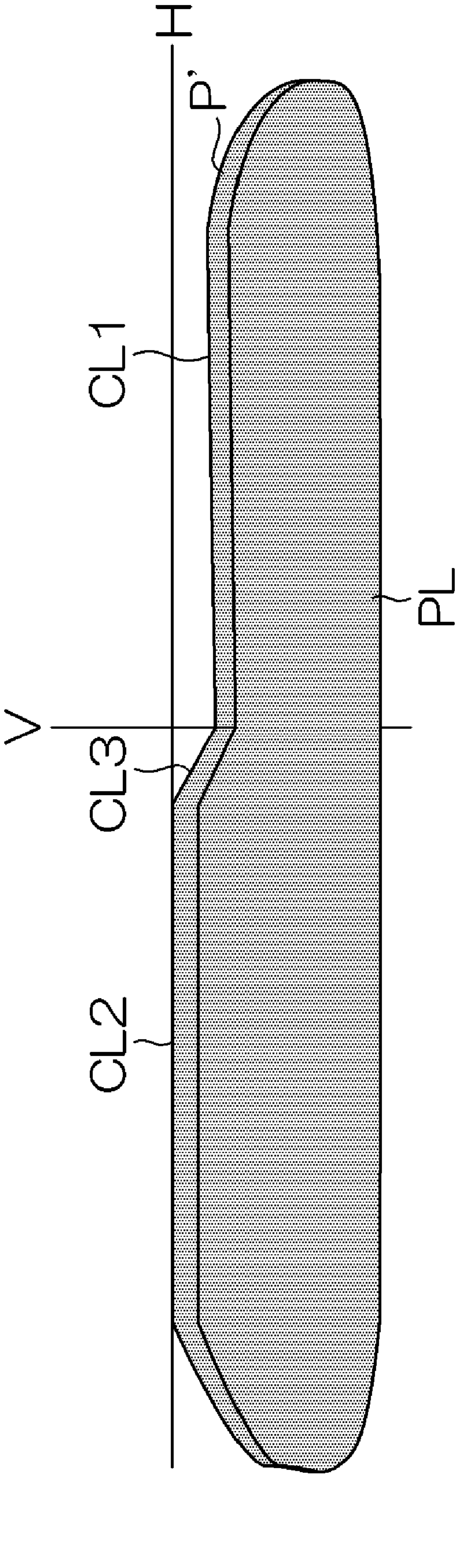
FIG. 11 is a schematic diagram showing a fundamental light distribution pattern formed on a virtual screen that is vertically located at 25 meters away from the projector headlight of FIG. 8, wherein the exemplary shade of FIG. 9*a* is used as a shade.
Figure 12:
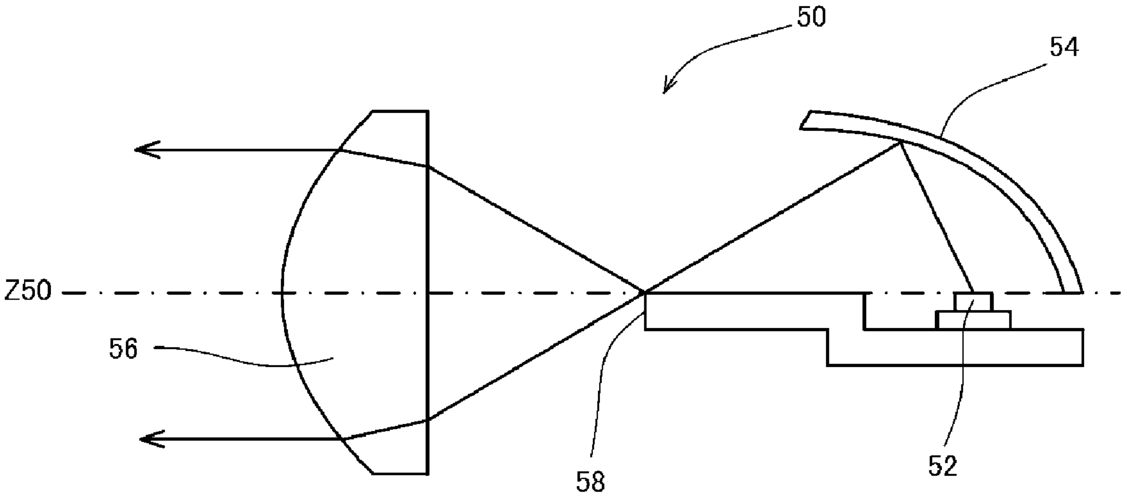
FIG.12 CONVENTIONAL ART
FIG. 12 is a schematic side cross-section view depicting a structure for a conventional projector headlight in which an LED is used as a light source.
Figure 13:
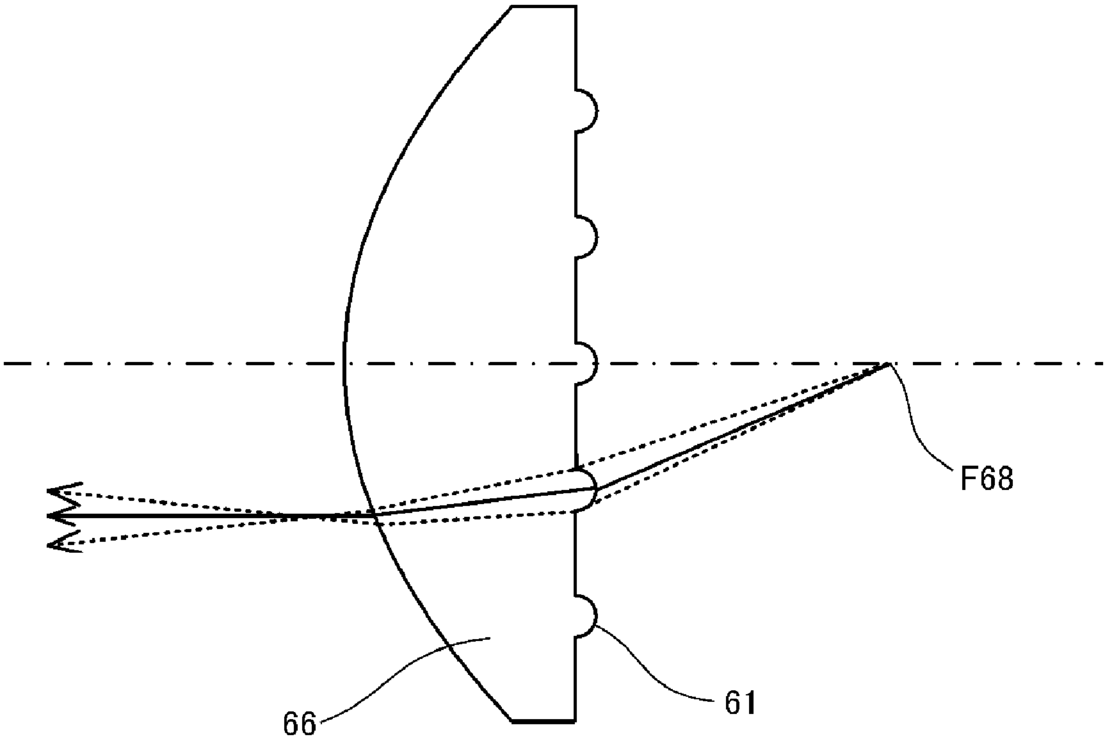
FIG.13 CONVENTIONAL ART
FIG. 13 is a schematic side cross-section view depicting a projector lens for another conventional projector headlight.

Thus, the projector headlight 10 of the disclosed subject matter can form the continuous blur portion P' underneath a horizontal cut-off line CL1-CL3 of a light distribution pattern PL as shown in FIG. 11 when the R surface 40, which is a non-reflex surface, is used to absorb light. Furthermore, in the above-described exemplary embodiment, the R surface 40 can also be formed within a prescribed range as shown and described with respect to FIG. 6.

A projector headlight using the LED light source and the shade 18 will now be given. The projector lens 16 and the shade 18 can be attached to a housing so that the neutral point of the shade 18 can be located substantially at the focus F of the projector lens 16, and so that the top edge 18*c* can be substantially bilaterally symmetric with respect to the optical axis of the projector lens 16 in the top view of the shade 18.

At least one ellipsoidal reflector having the first focus and the second focus can be attached to the base board 19 so that the first focus thereof can be located substantially at the LED light source, which is mounted on the base board 19. The at least one ellipsoidal reflector can be attached to the housing along with the base board 19 and projector lens 16 so that the optical axis of the LED light source can intersect with an imaginary line of the projector lens 16 that connects the first and second focuses of the ellipsoidal reflector to the optical axis of the projector lens 16, substantially at the first focus of at least the ellipsoidal reflector so as to correspond to each other in a vertical direction.

In this case, when an intersecting angle of the optical axis of the LED light source and the imaginary line of the projector lens 16 towards the at least one ellipsoidal reflector is smaller than the intersecting angle towards the projector lens 16, because a strong light near the optical axis of the LED light source can be reflected on a rearward part of the reflex surface 14*a* that is located on the opposite side of the projector lens 16, the projector headlight 10 can improve faraway or distance visibility.

In addition, second focuses of other ellipsoidal reflectors (other than the at least one ellipsoidal reflector) can be located substantially on the second top edge line 18*c*2 of the shade 18 and a virtual extending line of the second top edge line 18*c*2. Thereby, the projector headlight 10 may not concentrate light emitted from the LED light source at a central portion of the horizontal cut-off line, and can form a favorable light distribution pattern with a wide range.

However, the above-described structure may make it difficult to control light between the first top edge line 18*c*1 and the virtual extending line of the second top edge line 18*c*2, although such an ellipsoidal reflector may be easy to design and make. In addition, the structure may waste light in some cases because the second focuses of the ellipsoidal reflectors are located on the virtual extending line of the second top edge line 18*c*2, which is located under the first top edge line 18*c*1.

Consequently, the second focuses of the other ellipsoidal reflectors other than the at least one ellipsoidal reflector can be located substantially on the first top edge line 18*c*1 of the shade 18 and the second top edge line 18*c*2. In this case, the projector headlight 10 can provide a favorable light distribution pattern having a wide range and a high efficiency. Thus, the disclosed subject matter can provide a small projector headlight using the LED light source having low power consumption and a high efficiency, which can be employed for vehicles such as an electric car and the like.

Various modifications of the above disclosed embodiments can be made without departing from the spirit and scope of the presently disclosed subject matter. For example, the above-described R surface of the shade may not be limited to the circular arc shape. Instead, various shapes such as a slanted planar surface, an ellipsoidal surface, a parabolic surface and the like can be used as the R surface.

While there has been described what are at present considered to be exemplary embodiments of the invention, it will be understood that various modifications may be made thereto, and it is intended that the appended claims cover such modifications as fall within the true spirit and scope of the invention. All conventional art references described above are herein incorporated in their entirety by reference.

What is claimed is:

1. A projector headlight, comprising:

a light source;

at least one ellipsoidal reflector having a first focus and a second focus, and the first focus located substantially at the light source;

a projector lens having both a focus and an optical axis located substantially on an imaginary line connecting the first focus and the second focus of the at least one ellipsoidal reflector, and the focus of the projector lens being located substantially at the second focus of the at least one ellipsoidal reflector; and a shade having a top surface, a first top edge line, a second top edge line, a third top edge line, a front surface, a first front edge line, a second front edge line, a third front edge line and a neutral point, the top surface including the first top edge line, the second top edge line and the third top edge line, the front surface including the first front edge line, the second front edge line and the third front edge line, each of the first front edge line, the second front edge line and the third front edge line located so as to respectively face the first top edge line, the second top edge line and the third top edge line, the neutral point being an intersection of a virtual extending line of the second top edge line and another virtual line that passes at an intersection of the first top edge line and the third top edge line while intersecting with the virtual extending line of the second top edge line at a right angle, the neutral point located substantially at the focus of the projector lens and configured to form a horizontal cut-off line for both a driving lane and an oncoming lane with light emitted from the light source, and wherein each of the first, second and third front edge lines is respectively located closer to the projector lens than the first, second and third top edge line, and the first top edge line is located further upwards in a vertical direction of the projector headlight than the virtual extending line of the second top edge line.

2. The projector headlight according to claim 1, wherein each surface between the first top edge line and the first front edge line, between the second top edge line and the second front edge line, and between the third top edge line and the third front edge line is configured in a circular arc shape.

3. The projector headlight according to claim 2, wherein a portion of a radius of the circular arc between the first top edge line and the first front edge line is larger than another portion of the radius of the circular arc between the first top edge line and the first front edge line.

4. The projector headlight according to claim 1, wherein the top surface of the shade and each surface between the first top edge line and the first front edge line, between the second top edge line and the second front edge line, and between the third top edge line and the third front edge line are configured with a reflective surface, and the light source is a semiconductor light source.

5. The projector headlight according to claim 2, wherein the top surface of the shade and each surface between the first top edge line and the first front edge line, between the second top edge line and the second front edge line, and between the third top edge line and the third front edge line are configured with a reflective surface, and the light source is a semiconductor light source.

6. The projector headlight according to claim 3, wherein the top surface of the shade and each surface between the first top edge line and the first front edge line, between the second top edge line and the second front edge line, and between the third top edge line and the third front edge line are configured with a reflective surface, and the light source is a semiconductor light source.

7. The projector headlight according to claim 1, wherein the top surface of the shade and each surface between the first top edge line and the first front edge line, between the second top edge line and the second front edge line, and between the third top edge line and the third front edge line are configured with a non-reflective surface, and the light source is one of an HID lamp and a halogen bulb.

8. The projector headlight according to claim 2, wherein the top surface of the shade and each surface between the first top edge line and the first front edge line, between the second top edge line and the second front edge line, and between the third top edge line and the third front edge line are configured with a non-reflective surface, and the light source is one of an HID lamp and a halogen bulb.

9. The projector headlight according to claim 3, wherein the top surface of the shade and each surface between the first top edge line and the first front edge line, between the second top edge line and the second front edge line, and between the third top edge line and the third front edge line are configured with a non-reflective surface, and the light source is one of an HID lamp and a halogen bulb.

10. The projector headlight according to claim 1, further comprising other ellipsoidal reflectors, wherein a second focus of the other ellipsoidal reflectors is located substantially on at least one of the second top edge line of the shade and the virtual extending line of the second top edge line.

11. A projector headlight, comprising:

an LED light source having an optical axis and located on a base board;

at least one ellipsoidal reflector having a first focus and a second focus, and attached to the base board so that the first focus thereof is located substantially at the LED light source;

a projector lens having both a focus and an optical axis located substantially on an imaginary line that connects the first focus and the second focus of the at least one ellipsoidal reflector, and the focus of the projector lens being located substantially at the second focus of the at least one ellipsoidal reflector;

a shade having a top surface, a first top edge line, a second top edge line, a third top edge line, a front surface, a first front edge line, a second edge line, a third edge line and a neutral point, the top surface including the first top edge line, the second top edge line and the third top edge line, the front surface including the first front edge line, the second front edge line and the third front edge line, each of the first front edge line, the second front edge line and the third front edge line located so as to respectively face the first top edge line, the second top edge line and the third top edge line, the neutral point being an intersection of a virtual extending line of the second top edge line and another virtual line that passes at a intersection of the first top edge line and the third top edge line while intersecting with the virtual extending line of the second top edge line at a right angle, the neutral point located substantially at the focus of the projector lens and configured to form a horizontal cut-off line for both a driving lane and an oncoming lane with light emitted from the light source, and wherein each of the first, second and third front edge lines is respectively located closer to the projector lens than the first, second and third top edge line, and the first top edge line is located further upwards in a vertical direction of the projector headlight than the virtual extending line of the second top edge line; and a housing attaching the projector lens, the shade and the at least one ellipsoidal reflector, and wherein the optical axis of the LED light source intersects with the imaginary line of the projector lens substantially at the first focus of the at least one ellipsoidal reflector so as to correspond to each other in a vertical direction.

12. The projector headlight according to claim 11, wherein each surface between the first top edge line and the first front edge line, between the second top edge line and the second front edge line, and between the third top edge line and the third front edge line is configured in a circular arc shape and includes a reflective surface.

13. The projector headlight according to claim 12, wherein a portion of a radius of the circular arc between the first top edge line and the first front edge line is larger than another portion of the radius of the circular arc between the first top edge line and the first front edge line.

14. The projector headlight according to claim 11, wherein an intersecting angle of the optical axis of the LED light source and the imaginary line of the projector lens located towards the at least one ellipsoidal reflector is smaller than the intersecting angle at a location closer to the projector lens.

15. The projector headlight according to claim 12, wherein an intersecting angle of the optical axis of the LED light source and the imaginary line of the projector lens located towards the at least one ellipsoidal reflector is smaller than the intersecting angle at a location closer to the projector lens.

16. The projector headlight according to claim 13, wherein an intersecting angle of the optical axis of the LED light source and the imaginary line of the projector lens located towards the at least one ellipsoidal reflector is smaller than the intersecting angle at a location closer to the projector lens.

17. The projector headlight according to claim 11, further comprising other ellipsoidal reflectors, wherein each second focus of the other ellipsoidal reflectors is located substantially on at least one of the second top edge line of the shade and the virtual extending line of the second top edge line.

18. The projector headlight according to claim 12, further comprising other ellipsoidal reflectors, wherein each second focus of the other ellipsoidal reflectors is located substantially on at least one of the second top edge line of the shade and the virtual extending line of the second top edge line.

19. The projector headlight according to claim 11, further comprising other ellipsoidal reflectors, wherein each second focus of the other ellipsoidal reflectors is located substantially on at least one of the first top edge line of the shade and the second top edge line.

20. The projector headlight according to claim 12, further comprising other ellipsoidal reflectors, wherein each second focus of the other ellipsoidal reflectors is located substantially on at least one of the first top edge line of the shade and the second top edge line.

* * * * *